United States Patent
Hanatani

(10) Patent No.: US 8,305,393 B2
(45) Date of Patent: Nov. 6, 2012

(54) ELECTRONIC DEVICE, METHOD OF CONTROLLING DISPLAY, AND PROGRAM

(75) Inventor: Naoto Hanatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 251 days.

(21) Appl. No.: 12/680,812

(22) PCT Filed: Jul. 14, 2009

(86) PCT No.: PCT/JP2009/062723
§ 371 (c)(1),
(2), (4) Date: Mar. 30, 2010

(87) PCT Pub. No.: WO2010/010828
PCT Pub. Date: Jan. 28, 2010

(65) Prior Publication Data
US 2010/0214314 A1    Aug. 26, 2010

(30) Foreign Application Priority Data

Jul. 24, 2008   (JP) .................................. 2008-191169

(51) Int. Cl.
   G09G 5/02    (2006.01)
   G09G 5/00    (2006.01)
   G06F 3/048   (2006.01)
(52) U.S. Cl. .......... 345/593; 345/619; 345/636; 715/711
(58) Field of Classification Search ........................ None
   See application file for complete search history.

(56) References Cited

FOREIGN PATENT DOCUMENTS
| JP | 2004-213299 A | 7/2004 |
| JP | 2006-58917 A  | 3/2006 |
| JP | 2006-301712 A | 11/2006 |

OTHER PUBLICATIONS

Harrap's Shorter Dictionnaire FQS-1870 Users Guide, 2006, Chambers Harrap Publishers Ltd.*
Machine translated of IDS disclosed Japanese Patent: JP,2006-301712.*

* cited by examiner

*Primary Examiner* — Kee M Tung
*Assistant Examiner* — Sing-Wai Wu
(74) *Attorney, Agent, or Firm* — Birch, Stewart, Kolasch & Birch, LLP

(57) ABSTRACT

In an area selected as a highlighted display target, an area to be displayed in a highlighted manner or an area to be displayed in a character-invisible manner can be designated based on a color for highlighting. A display control unit for collectively controlling, for each area for which the same color has been designated, whether to display each selected area in at least text of a headword in a manner highlighted with a color designated for each area or to display the area in a character-invisible manner using the designated color and a first accepting unit for accepting designation of a color through a second input portion are provided. When there is an area displayed in a manner highlighted with the designated color at the time of acceptance of designation of the color, the display control unit causes the area displayed in the highlighted manner to be in turn displayed in a character-invisible manner using the designated color. On the other hand, when there is an area displayed in a character-invisible manner using the designated color at the time of acceptance of designation of the color, the display control unit causes the area displayed in the character-invisible manner to be in turn displayed in a manner highlighted with the designated color.

8 Claims, 14 Drawing Sheets

| NUMBER | PATTERN | COLOR INDICATED BY PATTERN |
|---|---|---|
| 1 |  | GREEN |
| 2 |  | YELLOW |
| 3 |  | PINK |

FIG.24

| DICTIONARY TYPE | JAPANESE LANGUAGE |
|---|---|
| WORD NUMBER | 1234 |

FIG.25

| POSITION OF CHARACTER AT END | 30 |
|---|---|
| POSITION OF CHARACTER AT BEGINNING | 36 |
| COLOR FOR HIGHLIGHTING | RED |

ELECTRONIC DEVICE, METHOD OF CONTROLLING DISPLAY, AND PROGRAM

TECHNICAL FIELD

The present invention relates to an electronic device having an electronic dictionary function, a method of controlling display on the electronic device, and a program causing a computer to perform the method of controlling display. In particular, the present invention relates to an electronic device capable of displaying meaning and contents of a headword for each headword, a method of controlling display, and a program.

BACKGROUND ART

An electronic dictionary provided with a highlighting function for highlighted display of a displayed character by highlighting the same has conventionally been known.

According to such an electronic dictionary, in detailed information on a headword registered in a wordbook, an area important for a user or an area the user wish to memorize can be highlighted. In addition, according to the electronic dictionary, character-invisible display of the highlighted area can be realized. Here, character-invisible display refers to display realized by changing a region corresponding to a character region of character(s) in that area to a color for highlighting that is set as a color of a background region of the character(s). Moreover, according to the electronic dictionary, the area displayed in a character-invisible manner can return to its original state, that is, to a state of highlighted display.

Japanese Patent Laying-Open No. 2004-213299 (Patent Document 1) discloses a configuration for highlighting a word indicating a result of search in accordance with a highlight position and displaying the same.

PRIOR ART DOCUMENTS

Patent Documents
Patent Document 1: Japanese Patent Laying-Open No. 2004-213299

SUMMARY OF THE INVENTION

Problems to be Solved by the Invention

In the conventional electronic dictionary, however, only a single color can be used for highlighting.

In addition, according to the conventional electronic dictionary, when character-invisible display as described above is attempted while a plurality of areas are highlighted, all highlighted areas are then displayed in a character-invisible manner. Therefore, the conventional electronic dictionary cannot realize character-invisible display only of a certain area within highlighted areas.

The present invention was made in view of the above-described problems, and an object of the present invention is to provide an electronic device capable of designating, in an area selected as a highlighted display target, an area to be displayed in a highlighted manner or an area to be displayed in a character-invisible manner based on a color for highlighting, a method of controlling display, and a program.
Means for Solving the Problems According to one aspect of the present invention, an electronic device is an electronic device having an electronic dictionary function. Assuming that displaying a character on a display, independently of a position of a cursor, with a color of background being different from a color of the character and being changed from a predetermined background color is defined as highlighted display and displaying a region corresponding to the displayed character and the background on the display by changing the color of the displayed character and the color of background into the different color of background is defined as character-invisible display, the electronic device includes display control means for collectively controlling whether to display each selected area in at least text of a headword in a manner highlighted with a color designated as the different color or to display that area in a character-invisible manner using the designated color, for each area for which an identical color has been designated as the different color, and first accepting means for accepting designation of a color through an input device. The display control means causes the area displayed in the manner highlighted with the designated color to be in turn displayed in the character-invisible manner using the designated color, in case there is an area displayed in the manner highlighted with the designated color when the first accepting means accepted designation of the color, while the display control means causes the area displayed in the character-invisible manner using the designated color to be in turn displayed in the manner highlighted with the designated color, in case there is an area displayed in the character-invisible manner using the designated color when the first accepting means accepted designation of the color.

In addition, preferably, the electronic device further includes second accepting means for accepting designation of a color to be used for highlighted display among a plurality of colors based on input through the input device and selection means for selecting the area based on input through the input device, and the display control means causes the selected area to be displayed in the manner highlighted with the color accepted by the second accepting means.

In addition, preferably, the display control means causes the display to display detailed information including the headword and the text of the headword, and the selection means selects the area in the displayed detailed information.

In addition, preferably, the first accepting means accepts designation of a color among the plurality of colors.

In addition, preferably, the display control means causes all selected areas to be displayed in the character-invisible manner when a first instruction is accepted.

In addition, preferably, the display control means causes the all selected areas to be displayed in the highlighted manner when a second instruction is accepted.

In addition, preferably, assuming that an operation mode in which highlighted display is carried out while character-invisible display is not carried out is defined as a first operation mode and an operation mode in which highlighted display and character-invisible display are carried out is defined as a second operation mode, the electronic device further includes operation mode change means for changing the operation mode at least from the first operation mode to the second operation mode, and the first accepting means accepts designation of the color when the operation mode is changed to the second operation mode.

In addition, preferably, the input device is implemented by a touch panel provided with a display function, the first accepting means accepts designation of a color among the plurality of colors based on input through the touch panel, and the second accepting means accepts designation of a color to be used for highlighted display among the plurality of colors based on input through the touch panel.

In addition, preferably, the display is implemented by a touch panel provided with an input function, the first accepting means accepts designation of a color among the plurality of colors based on input through the touch panel, and the second accepting means accepts designation of a color to be used for highlighted display among the plurality of colors based on input through the touch panel.

According to another aspect of the present invention, a method of controlling display on an electronic device is a method of controlling display on an electronic device having an electronic dictionary function. Assuming that displaying a character on a display, independently of a position of a cursor, with a color of background being different from a color of the character and being changed from a predetermined background color is defined as highlighted display and displaying a region corresponding to the displayed character and the background on the display by changing the color of the displayed character and the color of background into the different color of background is defined as character-invisible display, the method includes a display control step of collectively controlling whether to display each selected area in at least text of a headword in a manner highlighted with a color designated as the different color or to display that area in a character-invisible manner using the designated color, for each area for which an identical color has been designated as the different color, and an accepting step of accepting designation of a color. In the display control step, in case there is an area displayed in the manner highlighted with the designated color when designation of the color was accepted in the accepting step, the area displayed in the manner highlighted with the designated color is in turn displayed in the character-invisible manner using the designated color, and in case there is an area displayed in the character-invisible manner using the designated color when designation of the color was accepted in the accepting step, the area displayed in the character-invisible manner using the designated color is in turn displayed in the manner highlighted with the designated color.

According to yet another aspect of the present invention, a program is a program for causing a computer to perform the method of controlling display on the electronic device.

Effects of the Invention

According to the electronic device, the method of controlling display and the program of the present invention, such an effect that an area to be displayed in a highlighted manner or an area to be displayed in a character-invisible manner in an area selected as a highlighted display target can be designated based on a color for highlighting is achieved.

BRIEF DESCRIPTION OF THE DRAWINGS

FIG. 6 is a top view of a second input portion implemented by a touch panel, showing a state that a "pink" region has been selected by using a touch pen or the like.

FIG. 12 is a top view of the second input portion implemented by the touch panel, showing a state that a "green" region has been selected by using the touch pen or the like.

FIG. 24 is a diagram showing a data structure of identification information.

FIG. 25 is a diagram showing a data structure of additional information.

MODES FOR CARRYING OUT THE INVENTION

An electronic device 1 according to the present embodiment will be described with reference to FIGS. 1 to 25, as follows.

<As to Hardware Configuration>

Figure 1:
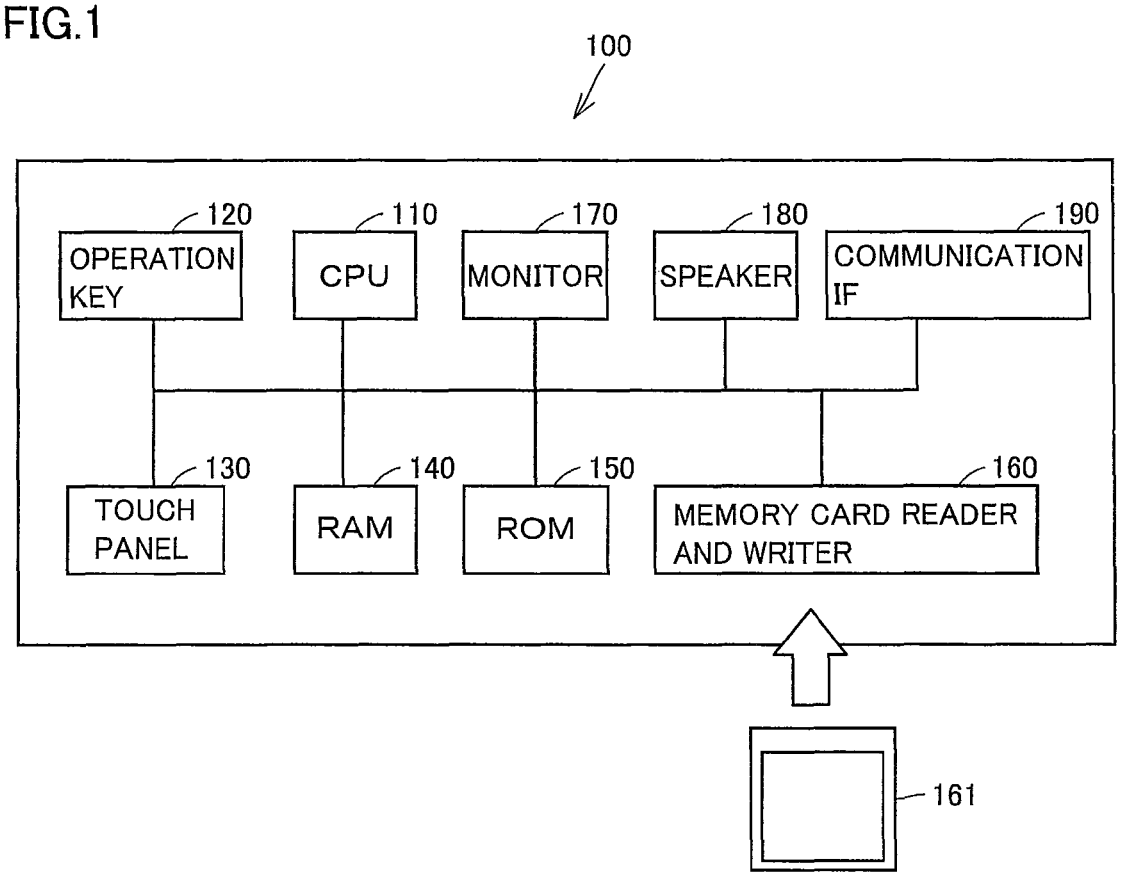
FIG. 1 is a block diagram representing a hardware configuration of a computer system functioning as an electronic device.

One manner of a specific configuration of electronic device 1 will initially be described. FIG. 1 is a block diagram representing a hardware configuration of a computer system 100 functioning as electronic device 1.

Computer system 100 includes, as main components, a CPU 110 for executing a program, an operation key 120 and a touch panel 130 for receiving input of an instruction from a user of computer system 100, a RAM 140 for storing in a volatile manner, data generated by execution of the program by CPU 110 or data input through operation key 120 or touch panel 130, a ROM 150 for storing data in a non-volatile manner, a memory card reader and writer 160, a monitor 170, a speaker 180, and a communication IF 190. The components are connected to one another through a data bus. A memory card 161 is attached to memory card reader and writer 160.

Processing in computer system 100 is implemented by each piece of hardware and software executed by CPU 110. Such software may be stored in ROM 150 in advance. Alternatively, software may also be stored in memory card 161 or another storage medium and distributed as a program product. Alternatively, software may also be provided as a downloadable program product by an information provider connected to what is called the Internet. Such software is read from the storage medium by means of memory card reader and writer 160 or another reading device or downloaded through communication IF 190, and once stored in ROM 150. The software is read from ROM 150 by CPU 110 and stored in RAM 140 in a format of an executable program. CPU 110 executes that program.

Each component in computer system 100 shown in FIG. 1 is common. Therefore, the essential part of the present invention may reside in software stored in RAM 140, ROM 150, memory card 161, or another storage medium, or software downloadable through a network. As an operation of each piece of hardware in computer system 100 has been well known, detailed description will not be repeated.

Here, a recording medium is not limited to a memory card, and a medium carrying a program in a non-volatile manner, such as a CD-ROM, an FD (Flexible Disk), a hard disk, a magnetic tape, a cassette tape, an optical disc (MO (Magnetic Optical Disc)/MD (Mini Disc)/DVD (Digital Versatile Disc)), an IC (Integrated Circuit) card (except for a memory card), an optical card, and a semiconductor memory such as a mask ROM, an EPROM (Electronically Programmable Read-Only Memory), an EEPROM (Electronically Erasable Programmable Read-Only Memory), or a flash ROM, may be adopted.

The program herein includes not only a program directly executable by a CPU but also a program in a source program format, a program subjected to compression processing, an encrypted program, and the like.

The configuration above is merely by way of example of a specific configuration, and electronic device 1 may be configured to include a mouse instead of touch panel 130. In addition, electronic device 1 may be configured, for example, to include a CD-ROM drive, and a CD-ROM may have a function as a memory card. Moreover, electronic device 1 may be configured to include a hard disk.

Monitor 170 can be implemented by various displays such as a liquid crystal display, an organic EL display, and the like.

Electronic device 1 will be described hereinafter as a portable electronic dictionary. Electronic device 1 is not limited to such an electronic dictionary, but a common personal computer or the like may be employed.

<As to Functional Blocks>

Figure 2:
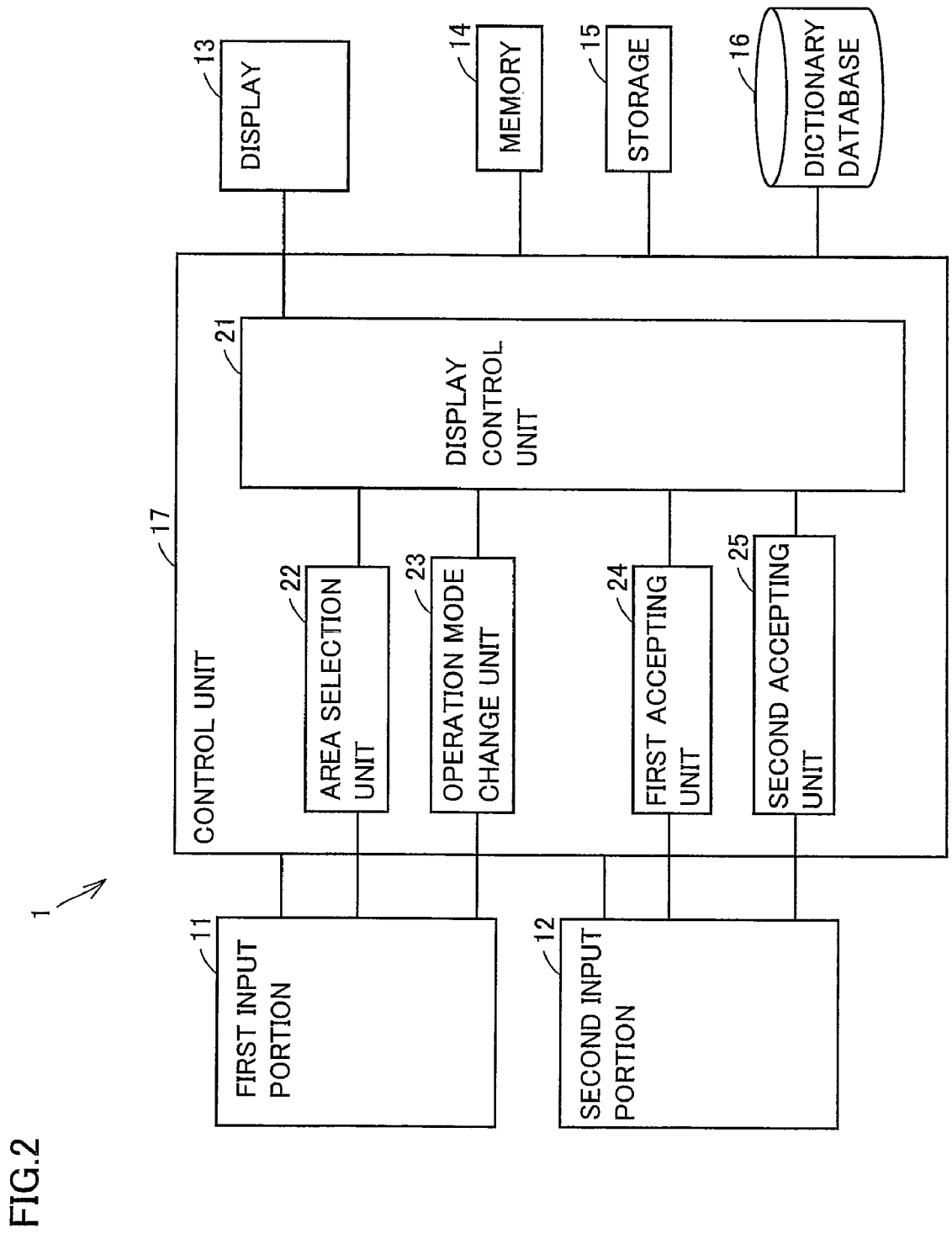
FIG. 2 is a functional block diagram showing a schematic configuration of the electronic device.

FIG. 2 is a functional block diagram showing a schematic configuration of electronic device 1.

As shown in FIG. 2, electronic device 1 includes a first input portion 11, a second input portion 12, a display 13, a memory 14, storage 15, a dictionary database 16, and a control unit 17.

First input portion 11 is an input device for accepting input from the user. For example, when the user inputs a word, a phrase or the like through first input portion 11, the input word, phrase or the like is temporarily stored in memory 14. First input portion 11 is constituted of a plurality of keys. First input portion 11 corresponds to operation key 120.

Second input portion 12 is an input device for accepting input from the user. In addition, second input portion 12 has a function as an input device and a display. When the user selects with a finger, a touch pen or the like, a region displayed on a display screen of the display, second input portion 12 accepts the input from the user. Second input portion 12 corresponds to touch panel 130. In addition, second input portion 12 has a function as a sub display of electronic device 1. Description will be given hereinafter assuming that second input portion 12 is implemented by a touch panel.

Display 13 is a device for displaying data input through first input portion 11 and second input portion 12 based on an instruction from control unit 17 and a result of various types of processing by control unit 17. Display 13 corresponds to monitor 170. Display 13 has a function as a main display of electronic device 1.

It is noted that electronic device 1 can be structured as a foldable device constituted of a lid body and a main body. Such a device can be structured to include display 13 on an inner surface side of the lid body and to include first input portion 11 and second input portion 12 on an inner surface side of the main body.

Memory 14 temporarily stores data input through first input portion 11, data input through second input portion 12, data processed by control unit 17, data being processed by control unit 17, and the like. For example, memory 14 temporarily stores dictionary data read from dictionary database 16 by control unit 17, which will be described later.

Storage 15 stores identification information for identifying a word (a headword) registered in a wordbook. Namely, storage 15 stores as the identification information, dictionary information indicating a type of a dictionary among a plurality of dictionaries stored in dictionary database 16, information for identifying a headword in the dictionary, and the like. In addition, storage 15 stores various programs for operating electronic device 1.

FIG. 24 is a diagram showing a data structure of identification information. Specifically, for example as shown in FIG. 24, storage 15 stores as the identification information, dictionary information indicating a Japanese language dictionary, a word number of a headword in the Japanese language dictionary, and the like. In addition, storage 15 stores additional information which will be described later.

It is noted that the word number refers to information indicating numbering of headwords in each dictionary. In addition, the text refers to sentence(s) describing meaning and contents of a headword. Moreover, detailed information refers to information including a headword and the text of the headword. It is noted that control unit 17 causes storage 15 to store data (writes data in storage 15) and reads the stored data therefrom.

Dictionary database 16 stores various types of dictionary data in advance. Dictionary database 16 stores, for example, dictionary data of a Japanese language dictionary, a Kanwa dictionary, which is a dictionary giving meaning of Chinese characters in Japanese, an English-Japanese dictionary, a Japanese-English dictionary, an encyclopedia, and the like.

Control unit 17 controls various operations of electronic device 1. Control unit 17 includes a display control unit 21, an area selection unit 22, an operation mode change unit 23, a first accepting unit 24, and a second accepting unit 25. As described above, processing by control unit 17 and each functional block in control unit 17 is implemented by software executed by the CPU.

Here, each functional block of control unit 17 will be described.

Display control unit 21 controls display contents to be displayed on display 13, in accordance with an instruction from the user through first input portion 11, an instruction from the user through second input portion 12, or the like. For example, display control unit 21 causes display 13 to display a list of headword candidates in each dictionary and detailed information. In addition, display control unit 21 uses identification information stored in storage 15 to read detailed information from dictionary database 16 and causes display 13 to display the read information. Thus, a headword registered in a wordbook or detailed information regarding the headword can be displayed on electronic device 1. Other display contents to be displayed on display 13 under the control by display control unit 21 will be described later.

Second accepting unit 25 accepts designation of a color to be used for highlighted display among a plurality of colors, based on input through second input portion 12. In the description below, each color among the plurality of colors is a color predetermined in electronic device 1. In the present embodiment, the predetermined color includes three colors of "green", "yellow" and "pink". It is noted that the color or the number of colors is not limited as such.

While the detailed information is displayed on display 13, area selection unit 22 selects an area of character(s) in the detailed information to be displayed in a manner highlighted with a color accepted by second accepting unit 25, based on input through first input portion 11. Specifically, area selection unit 22 selects characters from a character at a starting point to a character at an end point as an area of characters to be displayed in a highlighted manner, by accepting input designating the starting point and the end point for highlighted display.

Here, "highlighted display" refers to display of a character on display 13, independently of a position of a cursor, with a color of background being different (for example, yellow) from a color of the character (for example, black) and being changed from a predetermined background color (for example, white). In addition, "highlighting" refers to selection of an area to be highlighted by means of area selection unit 22 and highlighted display of the selected area under the control of display control unit 21.

It is noted that the "color defined in advance" refers to a color based on a value defined in advance in the program (for example, each value of RGB). Specifically, in the present embodiment, the color defined in advance is the color of the background region of character(s) in an area other than the area displayed in a highlighted manner. In addition, the "color defined in advance" also refers to a color of a region in which no character is displayed. Moreover, the "color defined in advance" may also refer to a color of the background region of character(s) when highlighted display is not carried out. Display with the color defined in advance is carried out by execution of the program stored in storage 15 by display control unit 21. Namely, display with the color defined in advance is carried out by execution of a command designating the color described in the program (a command in which processing contents are encoded) by display control unit 21.

Further, displaying a region corresponding to the displayed character and the background on display 13 by changing the color of the displayed character and the color of background into the different color of background is hereinafter referred to as "character-invisible display." In addition, when highlighted display is actually carried out, "character-invisible display" refers to display of character(s) in an invisible manner by changing the color of the character region in the area displayed in a highlighted manner to the color used for highlighted display.

Here, the "region corresponding to a character region" refers to a region that becomes a character region when a character in an area displayed in a highlighted manner is displayed in a visually recognizable manner under highlighted display. It is noted that the "character region" refers to a region except for a background region serving as a background of character(s), in a region of pixels (for example, a region of horizontal X dots×vertical Y dots) secured in displaying character(s). For the sake of description, the "region corresponding to a character region" will be denoted hereinafter as a "character-correspondence region."

An exemplary method for character-invisible display described above includes a method of changing a color of character(s) to a color used for highlighted display and a method of excluding information of character(s) from a display target and setting a color used for highlighted display for a region consisting of the character-correspondence region and the background region of the character(s).

Whether to carry out highlighted display or character-invisible display is controlled by display control unit 21. It is noted that a configuration in which a color of character(s) is not changed in highlighted display will be described hereinafter.

When an area to be displayed in a highlighted manner is selected, display control unit 21 uses the color accepted by second accepting unit 25 to cause the selected area to be displayed in a highlighted manner.

When control unit 17 accepts an instruction for highlighted display of other areas through first input portion 11, second accepting unit 25 accepts again designation of a color. In addition, area selection unit 22 selects an area again. Then, display control unit 21 uses the color accepted by second accepting unit 25 to cause the selected area to be displayed in a highlighted manner.

For example, when second accepting unit 25 accepts designation of "pink" and area selection unit 22 selects such characters as "dictionary, lexicon" in the text of the detailed information regarding a headword "dictionary", display control unit 21 causes display 13 to display the characters "dictionary, lexicon" with a background color thereof being changed to pink. In addition, when second accepting unit 25 accepts designation of "green" and then area selection unit 22 selects such characters as "dictionary software (for electronic dictionary or the like)" after highlighted display of "dictionary, lexicon" is carried out, display control unit 21 causes display 13 to display the characters "dictionary software (for electronic dictionary or the like)" with a background color thereof being changed to green.

Here, when control unit 17 accepts an instruction for registration of the headword displayed in a highlighted manner in a wordbook (specifically, a wordbook with highlight) through first input portion 11, control unit 17 causes storage 15 to store the identification information for identifying the headword displayed in a highlighted manner. Here, storage 15 stores the identification information and additional information for highlighted display of the detailed information on the headword identified by the identification information, in association with each other.

FIG. 25 is a diagram showing a data structure of additional information. The additional information includes area information indicating an area to be displayed in a highlighted manner or color information indicating a color or the like for highlighted display of that area (a color for highlighting). As shown in FIG. 25, information indicating a position of a character at the beginning of a selected area and a position of a character at the end of the area can be used as the area information. Here, the position serves as information indicating how manieth character from the first character in the detailed information is indicated.

Operation mode change unit 23 changes an operation mode of electronic device 1 based on input through first input portion 11. Exemplary change of the operation mode is change from a mode in which the detailed information can be highlighted as described above to an operation mode such as a highlight test mode.

The highlight test mode refers to a mode for enabling such setting that each area displayed in a highlighted manner is in turn displayed in a character-invisible manner so that the user temporarily cannot visually recognize character(s) in each area. It is noted that the area displayed in a highlighted manner refers to an area of which selection by area selection unit 22 has been completed.

For example, in the example of highlighted display described above, the background color of the characters "dictionary, lexicon" was set to pink. Character-invisible display in this case means change of a pixel value of a region of each pixel constituting such characters as "dictionary, lexicon" (a pixel of a character color) to a pixel value indicating pink, which is the same as the color of the background region of the characters. On the other hand, regarding the characters "dictionary software (for electronic dictionary or the like)," the background color thereof was set to green. Character-invisible display in this case means change of a pixel value of the region of each pixel constituting such characters as "dictionary software (for electronic dictionary or the like)" (a pixel of a character color) to a pixel value indicating green, which is the same as the color of the background region.

Here, when the operation mode is changed to the highlight test mode, display control unit 21 causes display 13 to display a list of headwords relating to identification information associated with the additional information, among pieces of identification information stored in storage 15.

When control unit 17 accepts processing for selecting one headword from the list of headwords through first input portion 11 while the list of the headwords is displayed, display control unit 21 causes display 13 to display detailed information on the selected headword.

In displaying this detailed information, display control unit 21 causes the area displayed in a highlighted manner to be in turn displayed in a character-invisible manner. Display control unit 21 does not change a color of character(s) in an area which is not displayed in a highlighted manner, and display control unit 21 allows the background of the character(s) to remain in the color defined in advance.

Thus, display control unit 21 controls a state of display of the detailed information on display 13 such that the area displayed in a highlighted manner is in turn displayed in a character-invisible manner and other characters remain displayed.

While electronic device 1 is operating in the highlight test mode, first accepting unit 24 accepts designation of at least one color among the plurality of colors described above, through second input portion 12.

Here, when first accepting unit 24 accepts designation of a color after each area displayed in a highlighted manner is set to a state of character-invisible display, display control unit 21 causes an area in each area above to be displayed in a manner highlighted with the color accepted by first accepting unit 24, to be in turn displayed in a manner highlighted with the accepted color. Thus, display control unit 21 changes that area from the state of character-invisible display to the state of highlighted display.

In the example of highlighted display described above, in the text of the detailed information on the headword "dictionary", the background color of the characters "dictionary, lexicon" was set to pink. In addition, the background color of the characters "dictionary software (for electronic dictionary or the like)" was set to green. In this example, a case where control unit 17 accepts processing for selecting the headword "dictionary" from the list of headwords after the operation mode was changed to the highlight test mode will be considered.

Here, initially, display control unit 21 sets both of the area of "dictionary, lexicon" and the area of "dictionary software (for electronic dictionary or the like)" to the state of character-invisible display. Namely, display control unit 21 changes the character-correspondence region in the area of "dictionary, lexicon" to pink, which is the same as the color of the background region, and changes the character-correspondence region in the area of "dictionary software (for electronic dictionary or the like)" to green, which is the same as the color of the background region.

Here, when first accepting unit 24 accepts designation of pink, display control unit 21 changes the area of "dictionary, lexicon" from the state of character-invisible display to the state of highlighted display. In this case, the area of "dictionary software (for electronic dictionary or the like)" remains in the state of character-invisible display. In addition, when first accepting unit 24 accepts designation of green, display control unit 21 changes the area of "dictionary software (for electronic dictionary or the like)" from the state of character-invisible display to the state of highlighted display. Thus, both areas of "dictionary, lexicon" and "dictionary software (for electronic dictionary or the like)" are set to the state of highlighted display so that the user can visually recognize both of these characters.

In addition, when first accepting unit 24 accepts designation of pink while the area of "dictionary, lexicon" and the area of "dictionary software (for electronic dictionary or the like)" are in the state of highlighted display, display control unit 21 changes the area of "dictionary, lexicon" from the state of highlighted display to the state of character-invisible display. On the other hand, when first accepting unit 24 accepts designation of green while the area of "dictionary, lexicon" and the area of "dictionary software (for electronic dictionary or the like)" are in the state of highlighted display, display control unit 21 changes the area of "dictionary software (for electronic dictionary or the like)" from the state of highlighted display to the state of character-invisible display.

Thus, in accordance with a color accepted by first accepting unit 24 and the number of times of acceptance of a color, display control unit 21 controls whether to display the area displayed in a manner highlighted with that color, in turn in a highlighted manner or in a character-invisible manner. Namely, display control unit 21 switches, for each color used for highlighted display, whether to display the area displayed in a highlighted manner, in turn in a highlighted manner or in a character-invisible manner.

In addition to such a function to individually manage display for each color, electronic device 1 also has a function to collectively manage display, regardless of a color. For example, when display control unit 21 accepts a first instruction through second input portion 12, display control unit 21 causes all areas selected by area selection unit 22 to be displayed in a character-invisible manner. On the other hand, when display control unit 21 accepts a second instruction through second input portion 12, display control unit 21 causes all areas selected by area selection unit 22 to be displayed in a highlighted manner.

Highlighted display and character-invisible display will further specifically be described hereinafter with reference to the drawings.

<As to Highlight Processing>

Figures 3, 4:
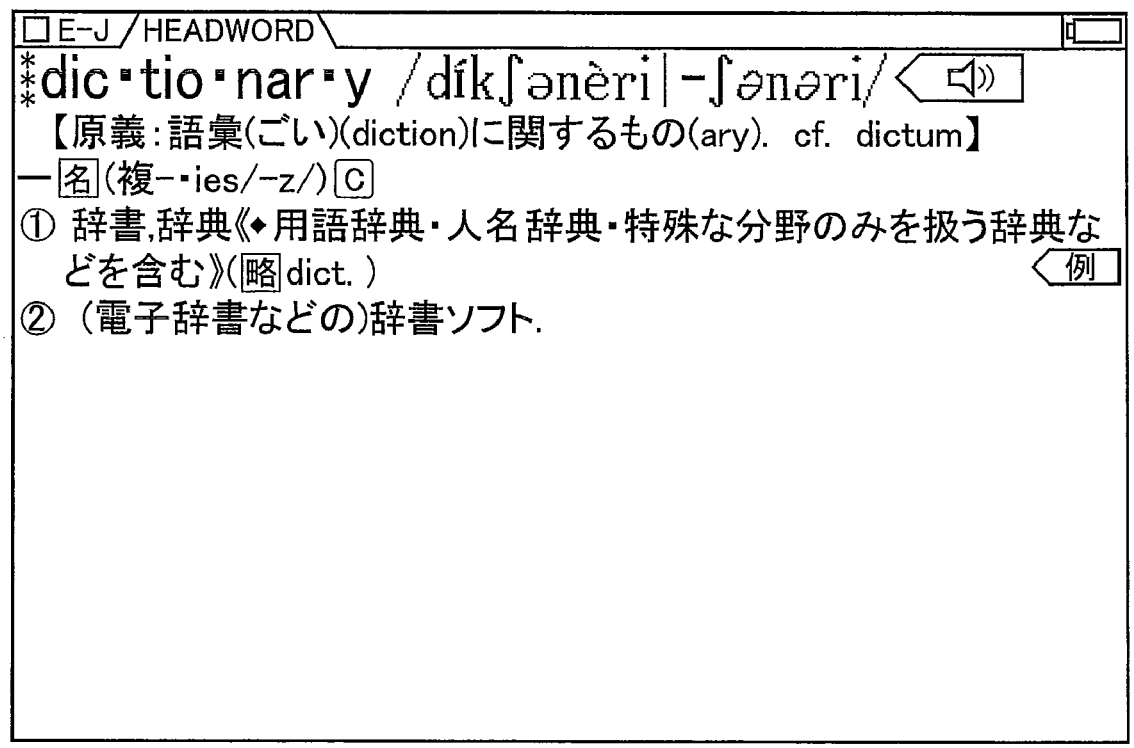
FIG. 3 is a diagram showing detailed information of a headword "dictionary" displayed on a display.
FIG. 4 is a diagram showing correspondence between a pattern and a color indicated by each pattern.

FIG. 3 is a diagram showing detailed information of a headword "dictionary" displayed on display 13. Here, the text of the detailed information (sentence(s) except for the headword displayed in the detailed information) is written in a language understood by the user (for example, an official language in the user's country). For example, in a case where a headword of detailed information is an English word as in FIG. 3, the text is written in Japanese. Here, a main user of electronic device 1 is Japanese. Alternatively, for example, the text is written in Chinese. Here, a main user of electronic device 1 is Chinese. This is also applicable to FIGS. 5, 7 to 11, 13, 14, 16, 19, and 21.

FIG. 4 is a diagram showing correspondence between a pattern shown in each figure (FIGS. 5, 7 to 11, 13 to 16, 19, and 21) which will be described later and a color indicated by each pattern. Namely, the pattern numbered with 1 indicates green, the pattern numbered with 2 indicates yellow, and the pattern numbered with 3 indicates pink.

Figure 5:
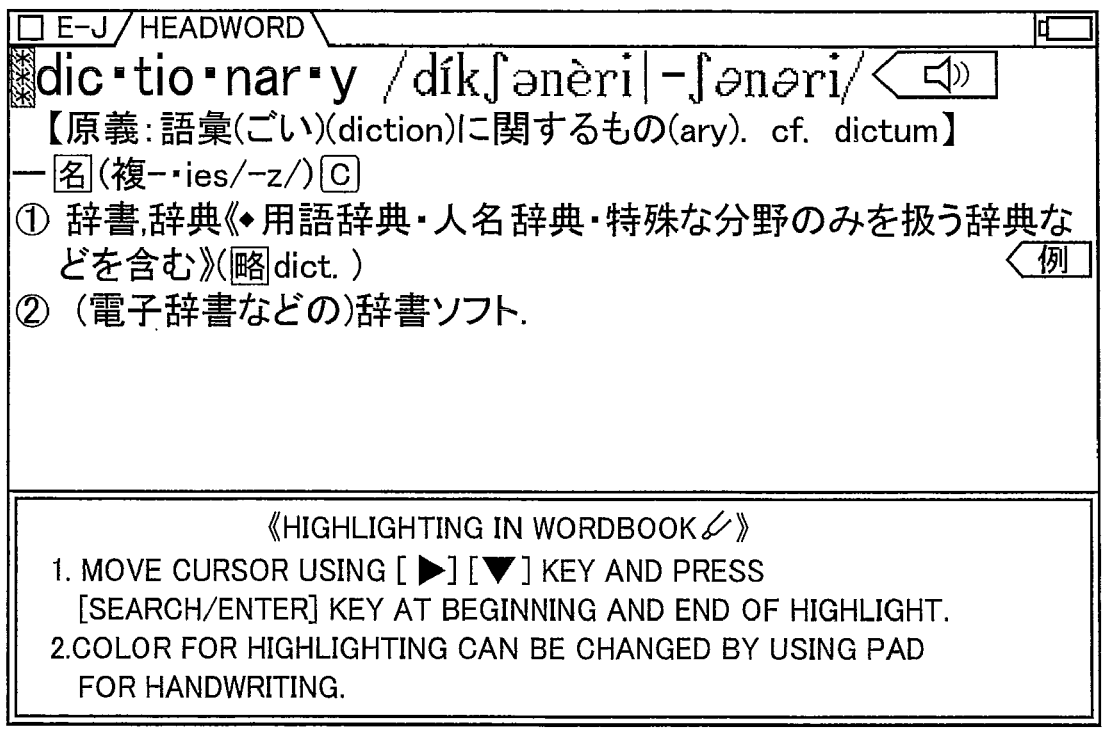
FIG. 5 is a diagram showing a state of the detailed information after the detailed information shown in FIG. 3 has been selected as a highlight processing target.

FIG. 5 is a diagram showing a state of the detailed information after the detailed information shown in FIG. 3 has been selected as a highlight processing target through first input portion 11. When such selection is made, as shown in FIG. 5, display control unit 21 changes a background color of a region in the upper left end in the display screen of display 13 (that is, a graphic region at the left end of the headword "dictionary") to a color used for previous highlighting. In the following, description will be given assuming that a state in FIG. 3 makes transition to a state in FIG. 5 when such an operation key as a highlight key in first input portion 11 is pressed.

In such a state as shown in FIG. 5, area selection unit 22 can select an area of the detailed information to be displayed in a highlighted manner, based on the input through first input portion 11. The user inputs an instruction for selecting the area by moving the cursor. In addition, in the state shown in FIG. 5, second accepting unit 25 accepts designation of a color to be used for highlighted display among the plurality of colors, based on input through second input portion 12.

Figure 6:
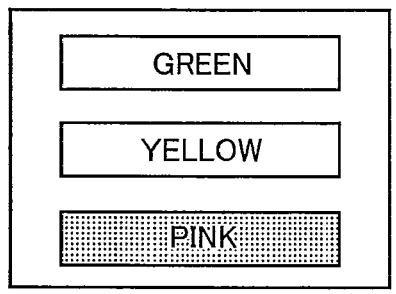

FIG. 6 is a top view of second input portion 12 implemented by a touch panel, showing a state that a "pink" region has been selected by using a touch pen or the like. Here, as shown in FIG. 6, the pink region is displayed in a manner different from that of other regions, so that the user can visually recognize selection of pink. It is noted that, for example, the region may be displayed in reverse video, without limited to the manner of display shown in FIG. 6. Alternatively, in the state shown in FIG. 6, the user can also select with the touch pen, any region of the "green" region and the "yellow" region. As a result of selection of one region from these three regions with the use of the touch pen, second accepting unit 25 accepts designation of a color to be used for highlighted display.

From a point of view of improved visual recognition, such a configuration that the touch panel is adapted to colored display is preferred. In particular, when a color is selected and reverse video display is carried out, background colors of the "green" region, the "yellow" region and the "pink" region to be used for reverse video display are preferably set to green, yellow and pink respectively, from a point of view of improved visual recognition.

Figure 7:
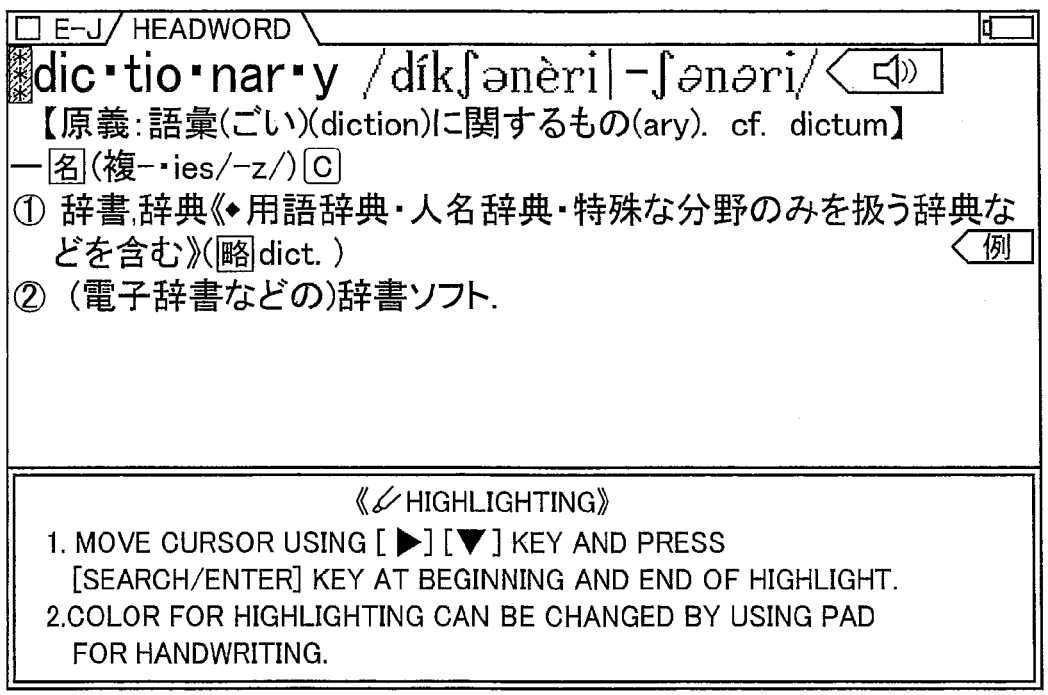
FIG. 7 is a diagram showing the detailed information after a second accepting unit accepted designation of "pink" as a color to be used for highlighted display among a plurality of colors.

FIG. 7 is a diagram showing the detailed information after second accepting unit 25 accepted designation of "pink" as a color to be used for highlighted display among the plurality of colors. Namely, FIG. 7 is a diagram showing the detailed information after the "pink" region has been selected with the touch pen in the state in FIG. 5. When the "pink" region is thus selected, display control unit 21 changes the background color of the graphic region to pink. Here, display control unit 21 carries out such control that a cursor position blinks in pink, which is the designated color.

Figure 8:
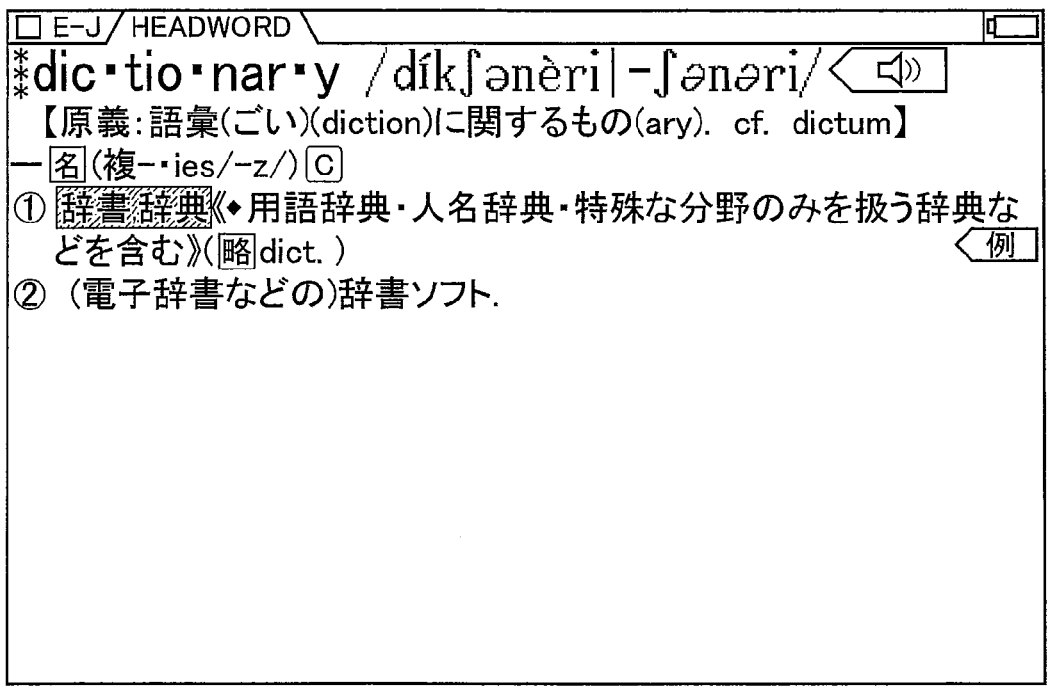
FIG. 8 is a diagram showing the detailed information after selection by an area selection unit of an area of characters to be displayed in a highlighted manner has been completed.

FIG. 8 is a diagram showing the detailed information after selection by area selection unit 22 of an area of characters to be displayed in a highlighted manner has been completed. When such selection is completed, the area of "dictionary, lexicon" is displayed in a manner highlighted with pink, as shown in FIG. 8.

When selection of the area is completed and the area is displayed in a highlighted manner, control unit 17 determines whether it accepted an instruction for registering the headword in the wordbook or not. When control unit 17 accepted the instruction, control unit 17 performs registration in a wordbook for registering the highlighted headword (a wordbook with highlight), instead of registration in a wordbook for registering a headword which is not highlighted (a normal wordbook). It is noted that the instruction for registration is given through first input portion 11.

Figure 9:
FIG. 9 is a diagram showing a state of a display screen of the display after registration in a wordbook with highlight was carried out.

FIG. 9 is a diagram showing a state of the display screen of display 13 after registration in the wordbook with highlight was carried out. As shown in FIG. 9, display control unit 21 causes display 13 to display a message on the display screen that registration of the highlighted headword has been completed.

Figure 10:
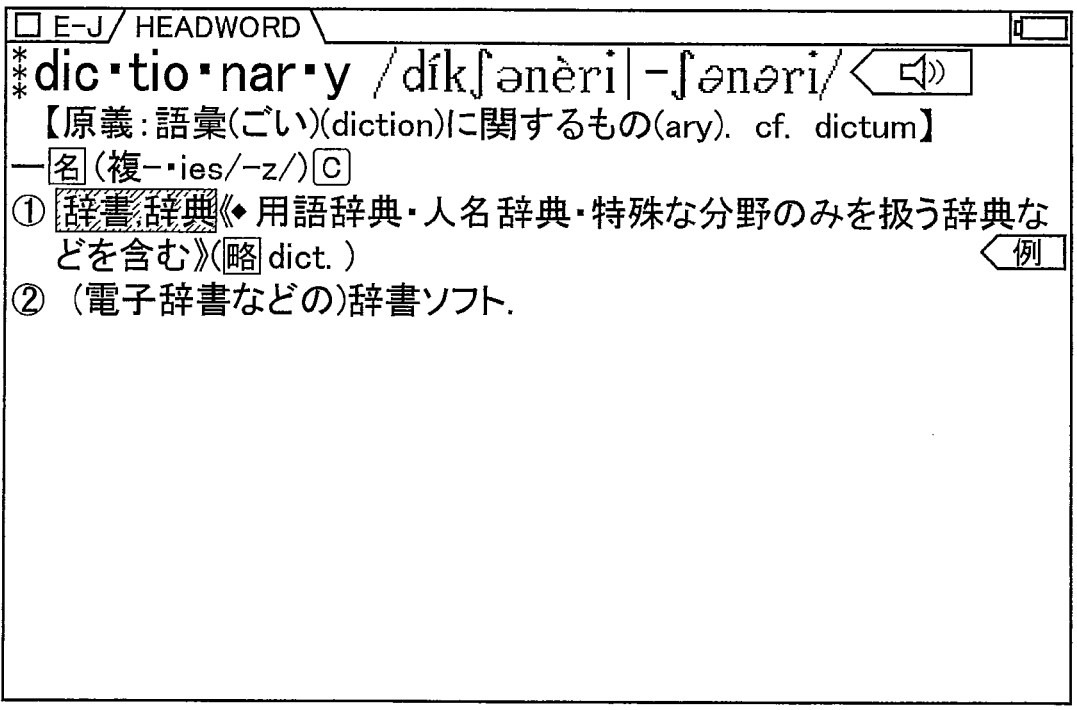
FIG. 10 is a diagram showing display contents displayed on the display screen of the display after lapse of a prescribed period of time since display of contents shown in FIG. 9.

FIG. 10 is a diagram showing display contents displayed on the display screen of display 13 after lapse of a prescribed period of time since display of contents shown in FIG. 9. As shown in FIG. 10, display control unit 21 has contents the same as the display contents shown in FIG. 8 displayed, after lapse of the prescribed period of time.

An example where an area other than "dictionary, lexicon" is displayed in a manner highlighted with a color different from pink will now be described.

Figure 11:
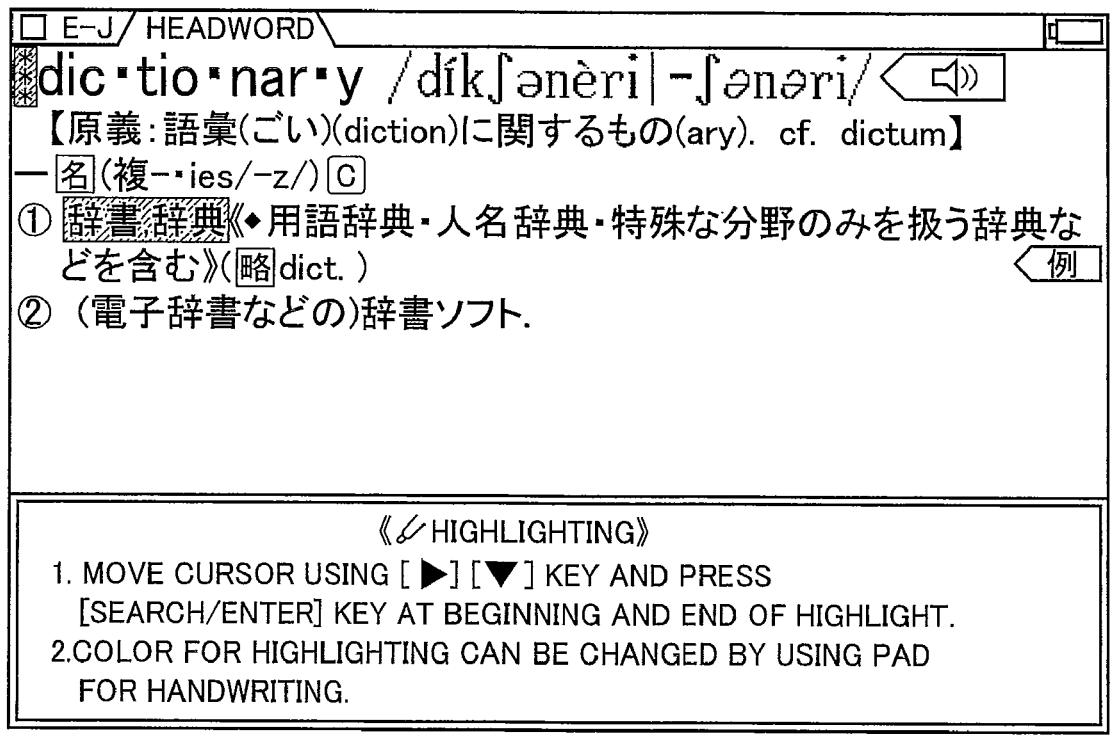
FIG. 11 is a diagram showing a state of the detailed information after the detailed information displayed in a manner highlighted with pink has been selected again as a highlight processing target.

FIG. 11 is a diagram showing a state of the detailed information after the detailed information displayed in a manner highlighted with pink has been selected again as a highlight processing target through first input portion 11. Here, display control unit 21 changes the background color of the graphic region to pink, which is the color used for previous highlighting.

Figure 12:
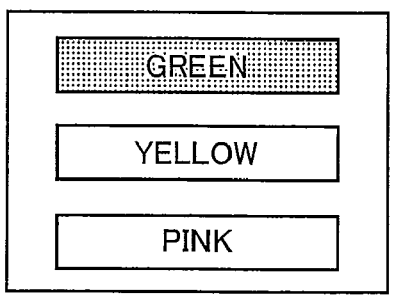

FIG. 12 is a top view of second input portion 12 implemented by the touch panel, showing a state that the "green" region has been selected by using the touch pen or the like. Here, as shown in FIG. 6, the green region is displayed in a manner different from that of other regions so that the user can visually recognize selection of green.

Figure 13:
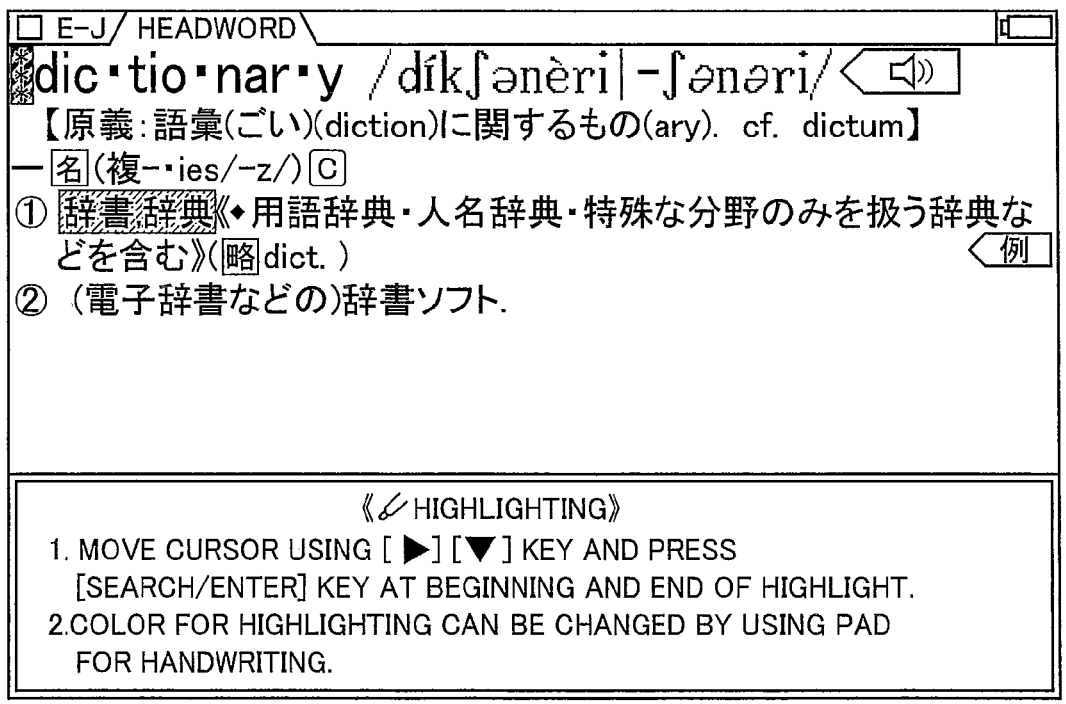
FIG. 13 is a diagram showing the detailed information after the second accepting unit accepted designation of "green" as a color to be used for highlighted display among a plurality of colors.

FIG. 13 is a diagram showing the detailed information after second accepting unit 25 accepted designation of "green" as a color to be used for highlighted display among the plurality of colors. Namely, FIG. 13 is a diagram showing the detailed information after the "green" region has been selected with the touch pen in the state in FIG. 11. When the "green" region is thus selected, display control unit 21 changes the background color of the graphic region to green.

Figure 14:
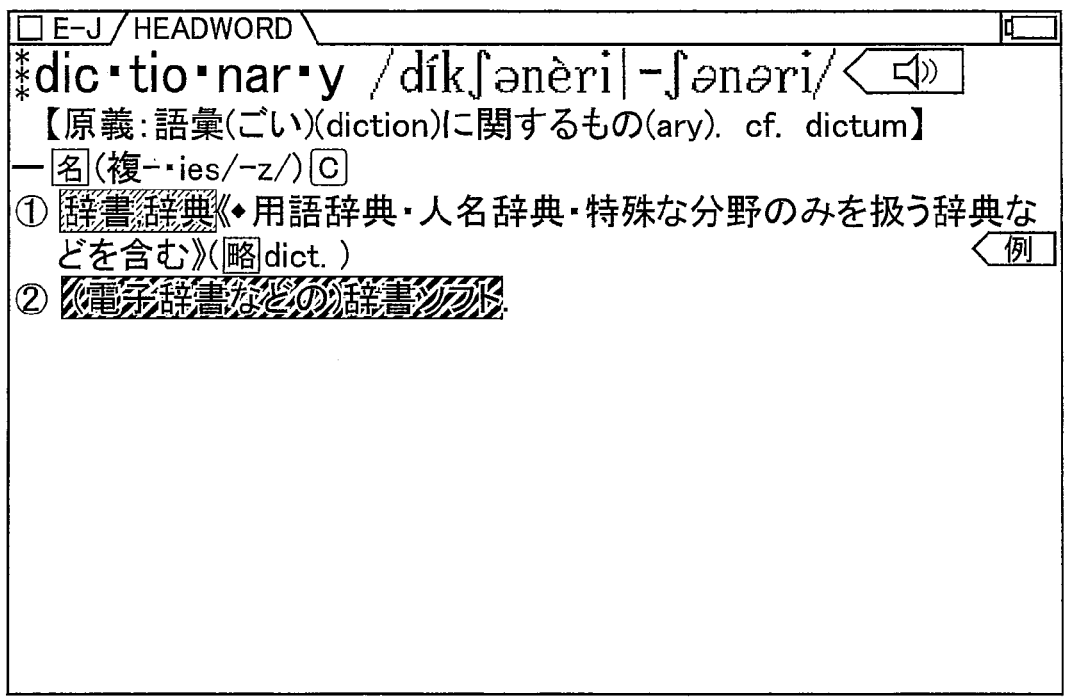
FIG. 14 is a diagram showing the detailed information after selection by the area selection unit of an area of characters to be displayed in a highlighted manner has been completed.

FIG. 14 is a diagram showing the detailed information after selection by area selection unit 22 of an area of characters to be displayed in a highlighted manner has been completed. When such selection is completed, as shown in FIG. 14, the area of "dictionary software (for electronic dictionary or the like)" is newly displayed in a manner highlighted with green. Thus, as shown in FIG. 14, the area of "dictionary, lexicon" is displayed in a manner highlighted with pink and the area of "dictionary software (for electronic dictionary or the like)" is displayed in a manner highlighted with green.

After the area of "dictionary software (for electronic dictionary or the like)" is also displayed in a highlighted manner, control unit 17 determines whether it accepted an instruction to register the headword "dictionary" in the wordbook or not, as described above. As the subsequent processing is the same as described with reference to FIGS. 9 and 10, description will not be repeated.

The configuration in which two areas are selected and they are highlighted with different colors has been described above by way of example, however, the present invention is not limited as such. For example, the present invention also encompasses a configuration in which three or more areas are selected and two or more areas out of the three or more areas are highlighted with the same color.

Thus, in electronic device 1, display control unit 21 can collectively control, for each selected area in the detailed information (the headword and the text of the headword), whether to display the area in a manner highlighted with a color designated as a different color described above or to display the area in a character-invisible manner using the designated color, for each area for which the same color is designated as the different color.

Thus, electronic device 1 can realize highlighted display using a plurality of colors, in displaying the detailed information of each headword. Therefore, electronic device 1 is more convenient than the configuration in which highlighted display using only a single color can be realized.

In displaying an area displayed in a manner highlighted with a certain color, in turn in a manner highlighted with a different color, in electronic device 1, setting for highlighted display of that area is canceled and thereafter new highlight processing is performed. Here, electronic device 1 preferably displays guidance on whether to cancel the setting for highlighted display or not, so as to have the user determine whether to cancel the setting for highlighted display. According to such a configuration, erroneous canceling of highlighted display can be avoided in electronic device 1. Thus, according to electronic device 1 configured as such, errors are less likely than in a device which is not configured to display guidance.

<As to Highlight Test>

An example where an operation mode of electronic device 1 is changed to a highlight test mode will now be described.

Figure 15:
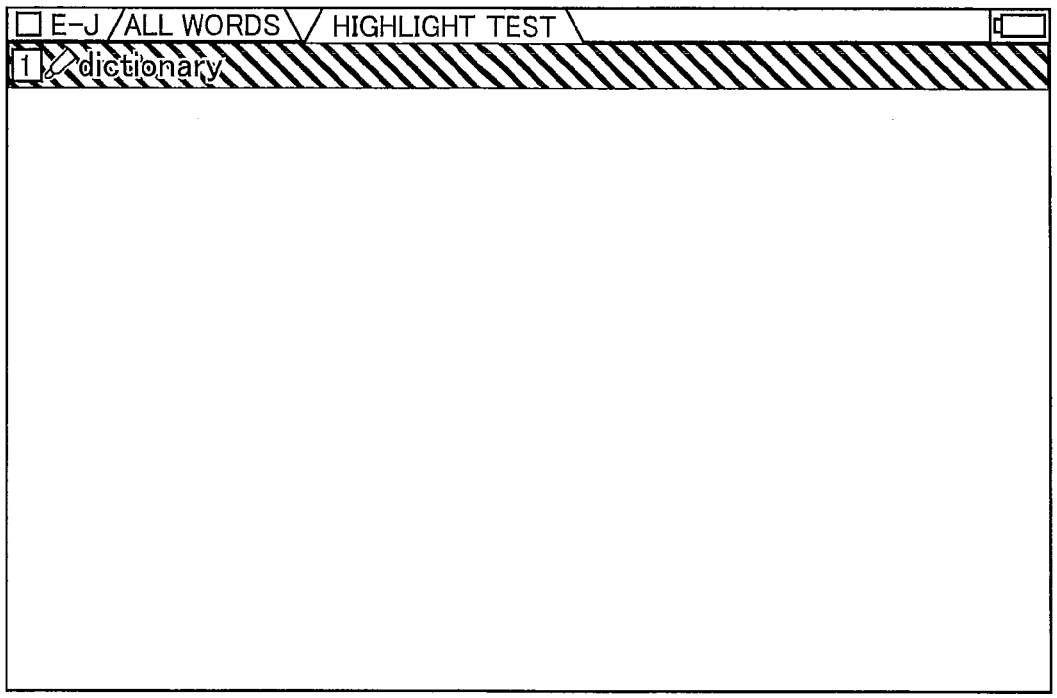
FIG. 15 is a diagram showing the display screen for selecting a headword for conducting a highlight test.

FIG. 15 is a diagram showing the display screen for selecting a headword for conducting a highlight test. When transition to the highlight test mode is made, as shown in FIG. 15, a list of headwords registered in the wordbook with highlight described above is displayed on the display screen of display 13. As the headword "dictionary" alone has been registered in the wordbook with highlight, FIG. 15 shows only the headword "dictionary".

Figure 16:
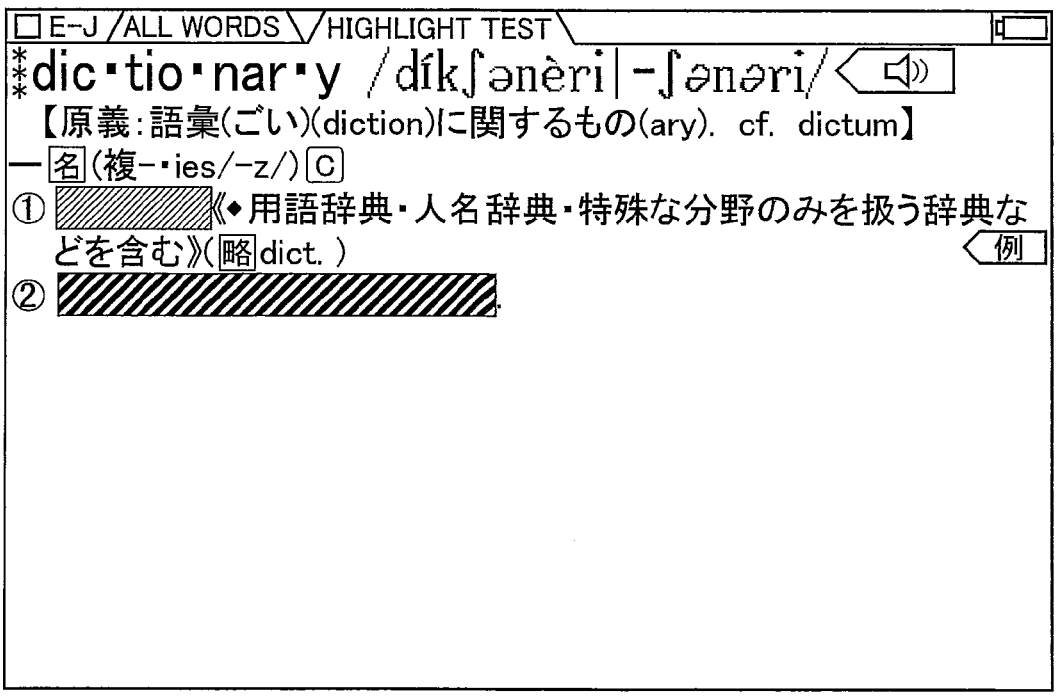
FIG. 16 is a diagram showing the display screen of the display after a headword "dictionary" has been selected.

FIG. 16 is a diagram showing the display screen of display 13 after a headword "dictionary" has been selected through input using first input portion 11 or the touch pen.

Here, as shown in FIG. 16, display control unit 21 makes such setting that each area displayed in a highlighted manner is in turn displayed in a character-invisible manner and the user cannot temporarily visually recognize the characters in that area. Namely, display control unit 21 sets the area of "dictionary, lexicon" and the area of "dictionary software (for electronic dictionary or the like)" to the state of character-invisible display.

As a result of such setting, two character strings showing meaning of the headword "dictionary" are hidden and the user cannot visually recognize the characters "dictionary, lexicon" and the characters "dictionary software (for electronic dictionary or the like)." Therefore, according to electronic device 1, the user can be invited to recall two meanings of the headword "dictionary".

Figure 17:
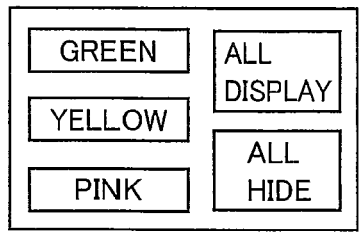
FIG. 17 is a top view of the second input portion implemented by the touch panel, showing a plurality of regions displayed at the time of the highlight test.

FIG. 17 is a top view of second input portion 12 implemented by the touch panel, showing a plurality of regions displayed at the time of the highlight test. As shown in FIG. 17, at the time of the highlight test, other than the "green" region, the "yellow" region and the "pink" region shown in FIG. 6 and the like, display control unit 21 causes a region "all display" and a region "all hide" to be displayed on the display screen of the touch panel.

Figure 18:
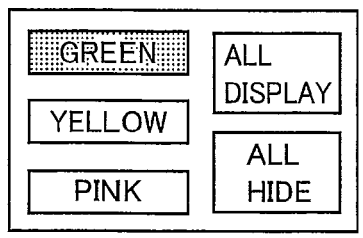
FIG. 18 is a top view of the second input portion implemented by the touch panel, showing a state that a "green" region has been selected in the state in FIG. 17.
Figure 19:
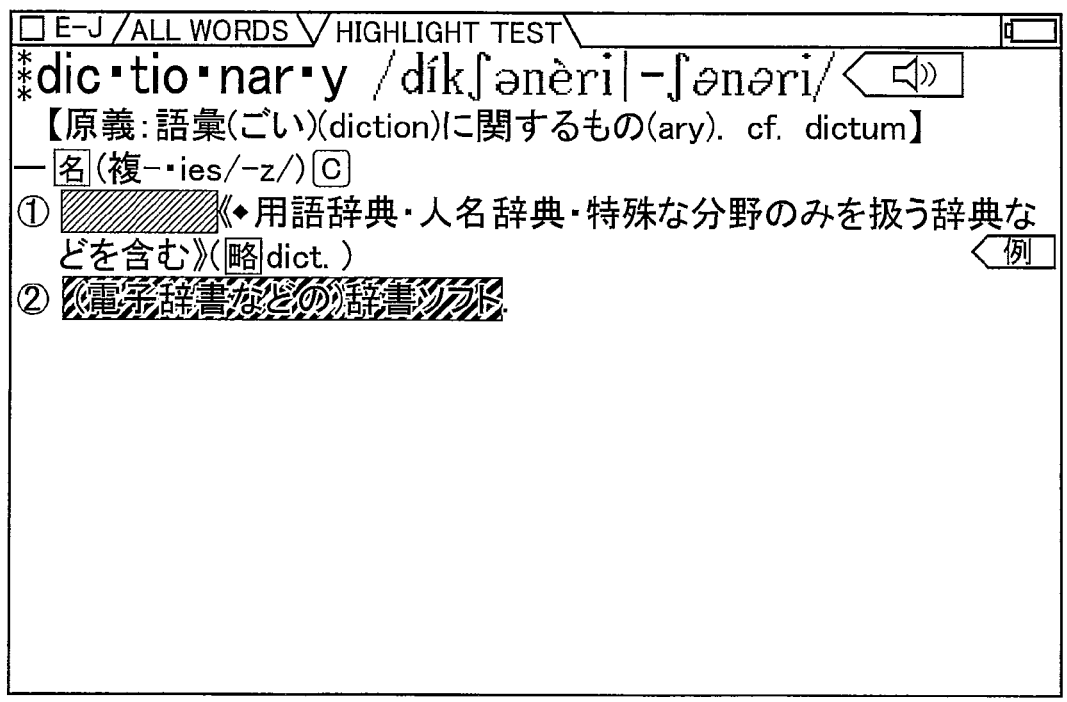
FIG. 19 is a diagram showing a state of the display screen of the display when the "green" region has been selected as shown in FIG. 18.

FIG. 18 is a top view of second input portion 12 implemented by the touch panel, showing a state that the "green" region has been selected in the state in FIG. 17. In addition, FIG. 19 is a diagram showing a state of the display screen of display 13 when the "green" region has been selected as shown in FIG. 18. When the "green" region is thus selected, as shown in FIG. 19, display control unit 21 causes the area displayed in a character-invisible manner using green to be in turn displayed in a manner highlighted with green.

Namely, when first accepting unit 24 accepts designation of a color through second input portion 12 and when there is an area displayed in a character-invisible manner using the designated color, display control unit 21 causes the area displayed in a character-invisible manner using the designated color to be in turn displayed in a manner highlighted with the designated color.

For example, when such processing that three or more areas are selected and two or more areas out of the three or more areas are highlighted with the same color has been performed, display control unit 21 causes each area displayed in a character-invisible manner with that color to be in turn displayed in a highlighted manner.

According to such display processing by display control unit 21, the user can visually recognize such characters as "dictionary software (for electronic dictionary or the like)." On the other hand, as shown in FIG. 19, such characters as "dictionary, lexicon" remain in a state visually unrecognizable by the user. Therefore, the user can cause only the area he/she wishes to see to selectively be displayed on the display screen of display 13.

Figure 20:
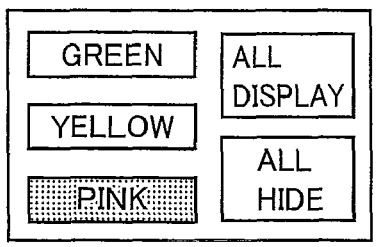
FIG. 20 is a top view of the second input portion implemented by the touch panel, showing a state that a "pink" region has been selected in the state in FIG. 19.
Figure 21:
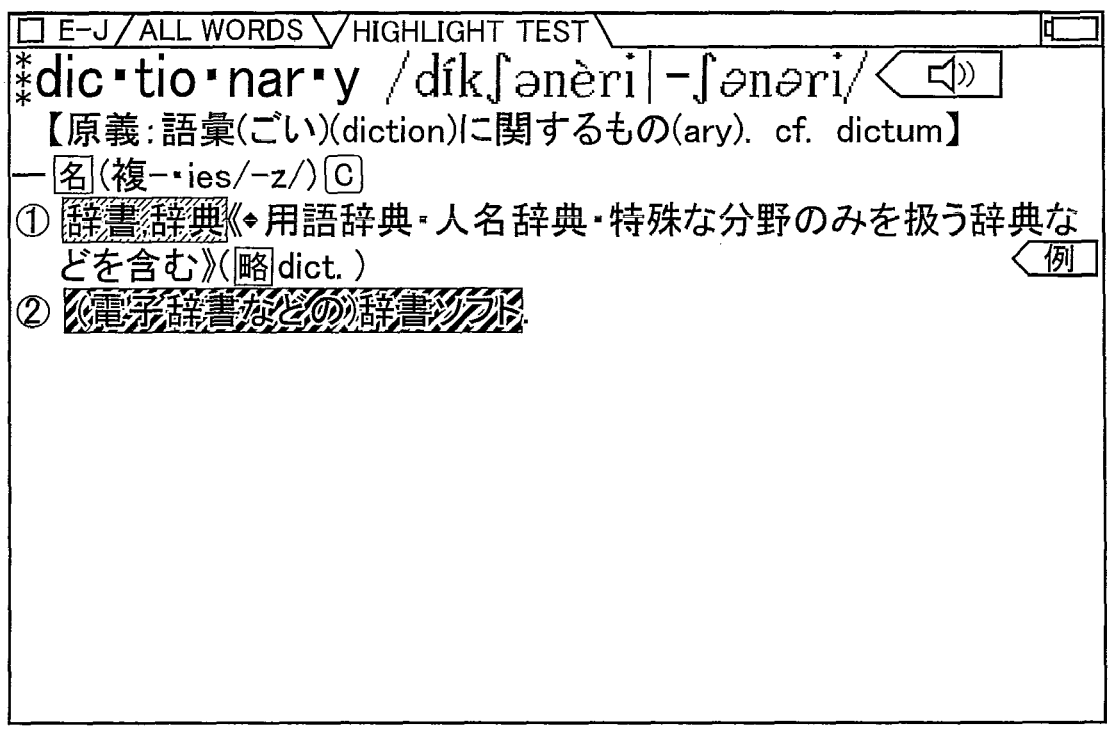
FIG. 21 is a diagram showing a state of the display screen of the display when the "pink" region has been selected as shown in FIG. 20.

FIG. 20 is a top view of second input portion 12 implemented by the touch panel, showing a state that the "pink" region has been selected in the state in FIG. 19. In addition, FIG. 21 is a diagram showing a state of the display screen of display 13 when the "pink" region has been selected as shown in FIG. 20. Thus, when the "pink" region is selected successively to the "green" region, as shown in FIG. 21, display control unit 21 causes also the area displayed in a character-invisible manner using pink to be in turn displayed in a manner highlighted with pink.

In addition, when the "pink" region is further selected in the state shown in FIG. 21, display control unit 21 causes the display screen of display 13 to make transition from the state in FIG. 21 to the state in FIG. 19. When the "green" region is further selected, display control unit 21 causes the display screen of display 13 to make transition from the state in FIG. 19 to the state in FIG. 16.

When the "green" region is further selected in the state shown in FIG. 21, display control unit 21 causes the area displayed in a manner highlighted with green (that is, the area of "dictionary software (for electronic dictionary or the like)" to be in turn displayed in a character-invisible manner using green.

Namely, when first accepting unit 24 accepts designation of a color through second input portion 12 and when there is an area displayed in a manner highlighted with the designated color, display control unit 21 causes the area displayed in a manner highlighted with the designated color to be in turn displayed in a character-invisible manner using the designated color.

For example, when such processing that three or more areas are selected and two or more areas out of the three or more areas are highlighted with the same color has been performed, display control unit 21 causes each area displayed in a manner highlighted with that color to be in turn displayed in a character-invisible manner.

An example where the region "all display" shown in FIGS. 17, 18 and 20 is selected with the touch pen or the like will now be described.

When the region "all display" is selected with the touch pen or the like in the state shown in FIG. 16, display control unit 21 causes the display contents on the display screen of display 13 to make transition from the state shown in FIG. 16 to the state shown in FIG. 21. Namely, when display control unit 21 accepts an instruction indicating selection of the region "all display" through second input portion 12, display control unit 21 causes all areas selected by area selection unit 22 to be displayed in a highlighted manner.

In addition, when the region "all display" is selected with the touch pen or the like in the state shown in FIG. 19 as well, display control unit 21 causes the display contents on the display screen of display 13 to make transition from the state shown in FIG. 19 to the state shown in FIG. 21.

As described above, as a result of selection of the region "all display" with the touch pen or the like by the user, display control unit 21 collectively causes the areas displayed in a character-invisible manner to make transition to the state of highlighted display, regardless of the color that has been used for character-invisible display. Therefore, when character-invisible display is carried out using a plurality of colors and when the user wishes to see contents of all areas being displayed in a character-invisible manner, the user can see the contents more quickly than in the configuration in which a region in each color of the plurality of colors is to be successively selected.

An example where the region "all hide" shown in FIGS. 17, 18 and 20 is selected with the touch pen or the like will now be described.

When the region "all hide" is selected with the touch pen or the like in the state shown in FIG. 21, display control unit 21 causes the display contents on the display screen of display 13 to make transition from the state shown in FIG. 21 to the state shown in FIG. 16. Namely, when display control unit 21 accepts an instruction indicating selection of the region "all hide" through second input portion 12, display control unit 21 causes all areas selected by area selection unit 22 to be displayed in a character-invisible manner.

In addition, when the region "all hide" is selected with the touch pen or the like in the state shown in FIG. 19 as well, display control unit 21 causes the display contents on the display screen of display 13 to make transition from the state shown in FIG. 19 to the state shown in FIG. 16.

Thus, as a result of selection of the region "all hide" with the touch pen or the like by the user, display control unit 21 collectively causes the areas displayed in a highlighted manner to make transition to the state of character-invisible display, regardless of the color that has been used for highlighted display. Therefore, when highlighted display is carried out using a plurality of colors and when the user wishes to make contents of all areas displayed in a highlighted manner invisible, the user can make the contents invisible more quickly than in the configuration in which a region in each color of the plurality of colors is to be successively selected.

As electronic device 1 is configured as described above, an area to be displayed in a highlighted manner or an area to be displayed in a character-invisible manner in an area selected as a highlighted display target can be designated based on a color for highlighting. Therefore, the user himself/herself can designate character(s) he/she wishes to display or character(s) he/she wishes to make invisible. Thus, the user can efficiently learn through a dictionary, by using electronic device 1.

<As to Process Flow>

Figure 22:
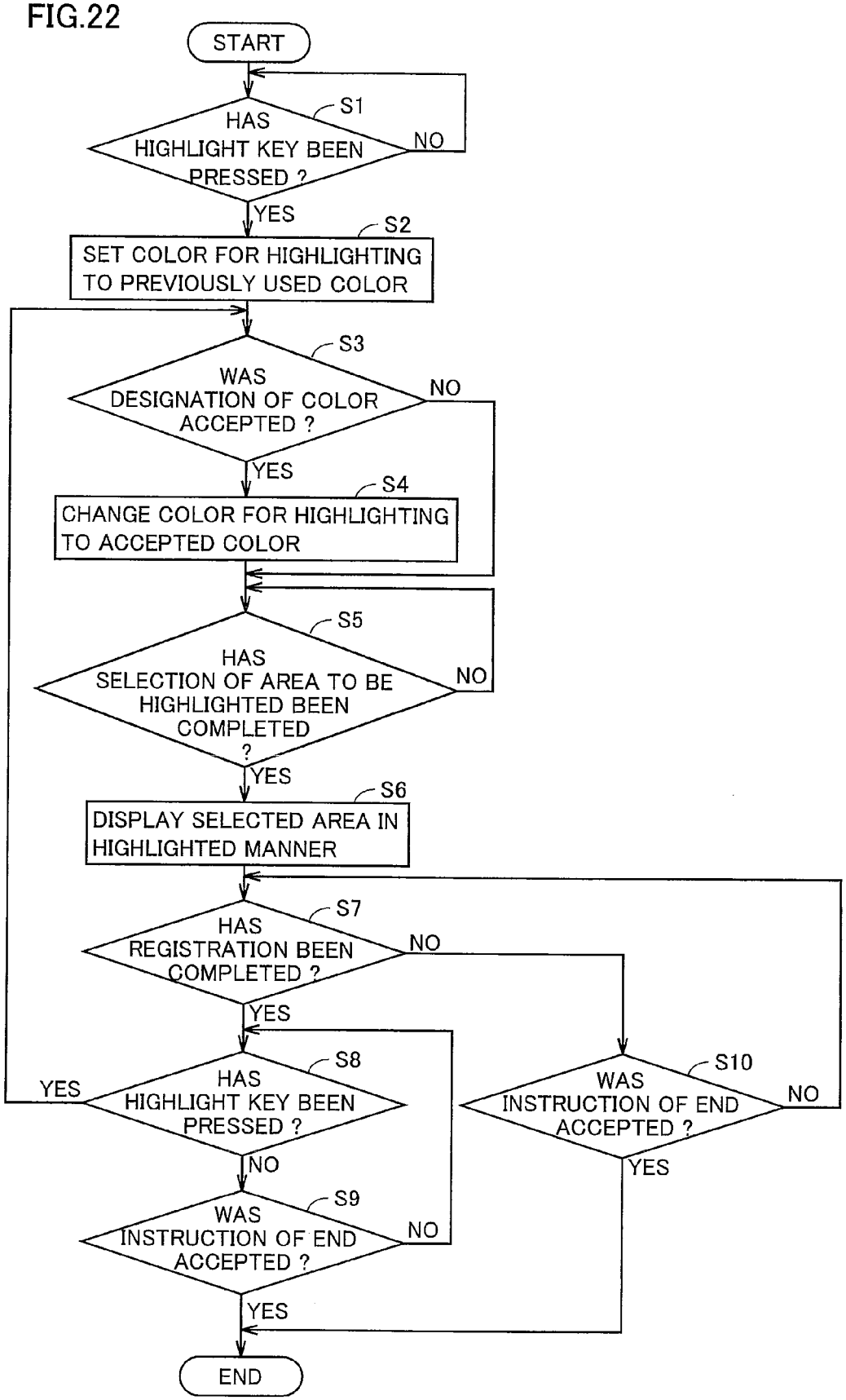
FIG. 22 is a flowchart showing a process flow of highlight processing.

FIG. 22 is a flowchart showing a process flow of highlight processing.

Initially, in step S1, control unit 17 determines whether the highlight key has been pressed or not. When it is determined in step S1 that the highlight key has been pressed, display control unit 21 sets the color for highlighting to the color that was used for previous highlighting (S2). If highlight processing has not been performed in the past, display control unit 21 should only set the color for highlighting to a default color. On the other hand, when it is determined in step S1 that the highlight key has not been pressed, the process returns to step S1.

Subsequent to step S2, display control unit 21 determines whether designation of a color was accepted through second input portion 12 or not (S3). When it is determined in step S3 that designation of a color was accepted, display control unit 21 changes a color to be used for highlighted display to the accepted color (S4) and thereafter the process proceeds to step S5. On the other hand, when it is not determined in step S3 that designation of a color was accepted, the process proceeds to step S5 without performing the processing in step S4.

In step S5, display control unit 21 determines whether selection of an area to be highlighted been completed or not. When it is determined in step S5 that selection of an area has been completed, display control unit 21 causes the selected area to be displayed in a highlighted manner (S6). Here, when the color has been changed in step S4, highlighted display is carried out by using the resultant color. On the other hand, when it is not determined in step S3 that designation of a color was accepted, highlighted display is carried out using the previously used color. Subsequent to step S6, control unit 17 determines whether processing for registering a headword, for which highlighted display processing is being performed, in the wordbook with highlight has been completed or not (S7).

When it is determined in step S7 that registration has been completed, control unit 17 determines whether the highlight key has been pressed or not (S8). When it is determined in step S8 that the highlight key has been pressed, the process returns to step S3. On the other hand, when it is not determined in step S8 that the highlight key has been pressed, control unit 17 determines whether it accepted an end instruction indicating end of highlight processing or not (S9). It is noted that the end instruction is input through first input portion 11.

When it is determined in step S9 that the end instruction was accepted, a series of processing ends. On the other hand, when it is not determined in step S9 that the end instruction was accepted, the process returns to step S8.

When it is not determined in step S7 that registration has been completed, control unit 17 determines whether it accepted an end instruction indicating end of highlight processing or not (S10). When it is determined in step S10 that the end instruction was accepted, a series of processing ends.

On the other hand, when it is not determined in step S10 that the end instruction was accepted, the process returns to step S7.

Figure 23:
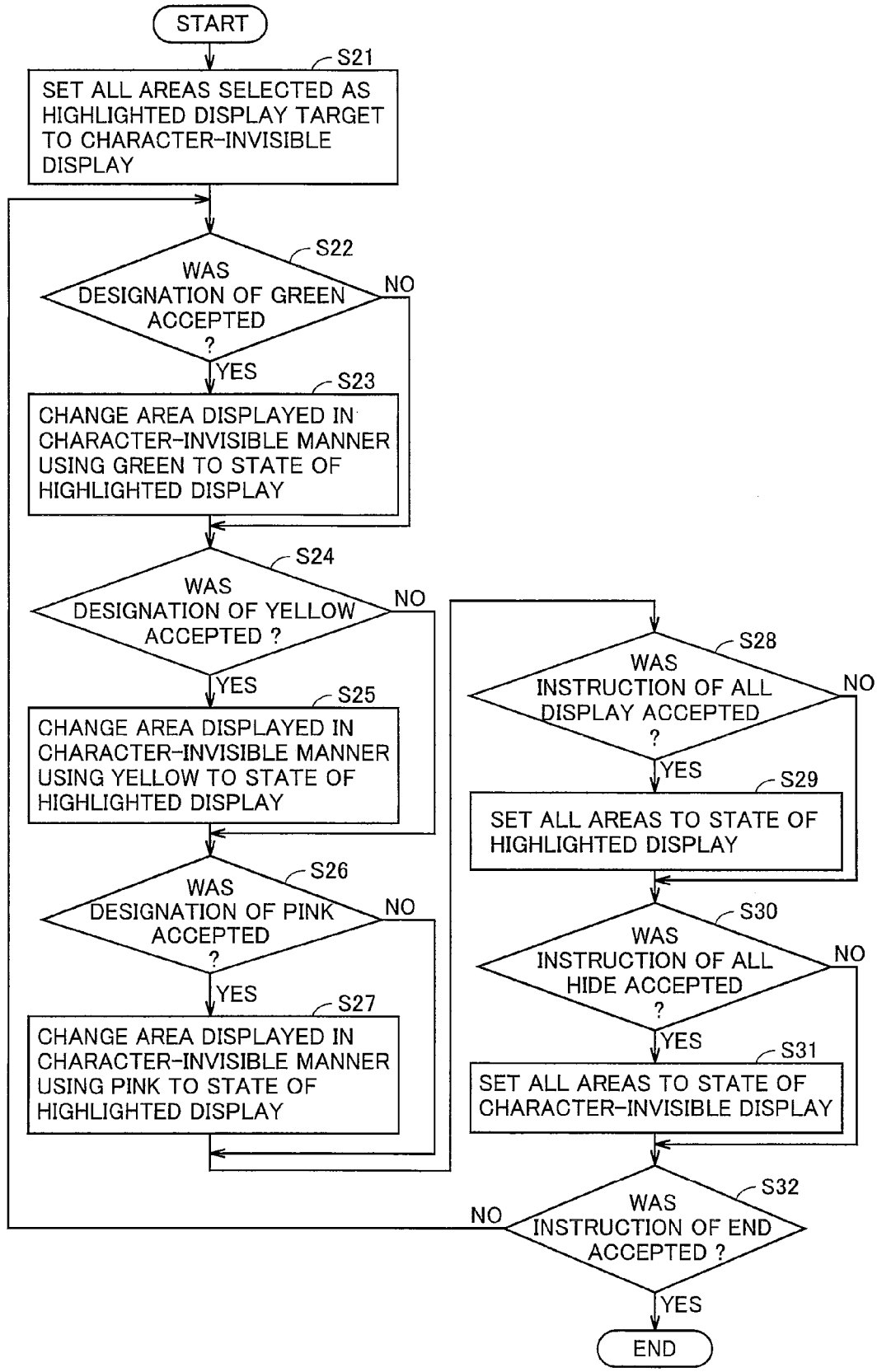
FIG. 23 is a flowchart showing a process flow after one headword has been selected in a highlight test mode.

FIG. 23 is a flowchart showing a process flow after one headword has been selected in the highlight test mode.

Initially, in step S21, display control unit 21 sets all areas selected as highlighted display targets to character-invisible display as shown in FIG. 16. Subsequent to step S1, display control unit 21 determines whether it accepted designation of green through second input portion 12 or not (S22). When it is determined in step S22 that designation of green was accepted, display control unit 21 changes the area displayed in a character-invisible manner using green to the state of highlighted display (S23) and thereafter the process proceeds to step S24. On the other hand, when it is not determined in step S22 that designation of green was accepted, the process proceeds to step S24 without performing the processing in step S23.

In step S24, display control unit 21 determines whether it accepted designation of yellow through second input portion 12 or not. When it is determined in step S24 that designation of yellow was accepted, display control unit 21 changes the area displayed in a character-invisible manner using yellow to the state of highlighted display (S25) and thereafter the process proceeds to step S26. On the other hand, when it is not determined in step S24 that designation of green was accepted, the process proceeds to step S26 without performing the processing in step S25.

In step S26, display control unit 21 determines whether it accepted designation of pink through second input portion 12 or not. When it is determined in step S26 that designation of pink was accepted, display control unit 21 changes the area displayed in a character-invisible manner using pink to the state of highlighted display (S27) and thereafter the process proceeds to step S28. On the other hand, when it is not determined in step S26 that designation of green was accepted, the process proceeds to step S28 without performing the processing in step S27.

In step S28, display control unit 21 determines whether it accepted an instruction of all display through second input portion 12 or not. When it is determined in step S28 that the instruction of all display was accepted, display control unit 21 sets all areas to the state of highlighted display (S29). Namely, display control unit 21 sets each area to the state of highlighted display by using the color for highlighting designated for each area in highlighted display. Subsequent to step S29, the process proceeds to step S30. On the other hand, when it is not determined in step S28 that the instruction of all display was accepted, the process proceeds to step S30 without performing the processing in step S29.

In step S30, display control unit 21 determines whether it accepted an instruction of all hide through second input portion 12 or not. When it is determined in step S28 that the instruction of all hide was accepted, display control unit 21 sets all areas to the state of character-invisible display (S31). Namely, display control unit 21 sets each area to the state of character-invisible display by using the color for highlighting designated for each area in highlighted display. Subsequent to step S31, the process proceeds to step S32. On the other hand, when it is not determined in step S30 that the instruction of all hide was accepted, the process proceeds to step S32 without performing the processing in step S31.

In step S32, control unit 17 determines whether it accepted an end instruction indicating end of the highlight test mode or not. It is noted that the end instruction is input through first input portion 11. When it is determined in step S32 that the end instruction was accepted, the highlight test mode ends.

On the other hand, when it is not determined in step S32 that the end instruction was accepted, the process returns to step S22.

<Variation>

(1) The configuration in which an area to be displayed in a highlighted manner is selected from a headword and the text of the headword (that is, the detailed information) has been described above by way of example, however, the present invention is not limited thereto. For example, electronic device 1 may be configured to select an area only from the text.

(2) The configuration in which second input portion 12 is provided with a function as a display separately from display 13 has been described above by way of example, however, the present invention is not limited thereto. Display 13 may be configured as a touch panel and display 13 may include second input portion 12. Here, display control unit 21 should only be configured to control display such that the region shown in FIG. 6 and the like is shown in a partial region of the display screen of display 13.

(3) The configuration in which a headword displayed in a highlighted manner is stored in the wordbook with highlight has been described above by way of example, however, the present invention is not limited thereto. For example, the configuration may be such that the detailed information displayed in a highlighted manner overwrites the detailed information stored in dictionary database 16, instead of storage in storage 15.

(4) The configuration in which a headword is highlighted and then the headword is registered in the wordbook with highlight has been described above by way of example, however, the present invention is not limited thereto. For example, the configuration may be such that a headword is registered in the wordbook with highlight and then highlighted.

(5) The configuration in which only a single color corresponds to each region such as a "green" region, a "yellow" region and a "pink" region has been described above by way of example, however, the present invention is not limited thereto. For example, electronic device 1 may be configured such that a plurality of colors can be designated, such as "green and yellow" regions.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Description of the Reference Signs 1 electronic device; 11 first input portion; 12 second input portion; 13 display; 15 storage; 16 dictionary database; 17 control unit; 21 display control unit; 22 area selection unit; 23 operation mode change unit; 24 first accepting unit; and 25 second accepting unit.

The invention claimed is:

1. An electronic device having an electronic dictionary function, assuming that displaying a character on a display, independently of a position of a cursor, with a color of background being different from a color of the character and being changed from a predetermined background color is defined as highlighted display and displaying a region corresponding to said displayed character and the background on the display by changing the color of the displayed character and the color of background into said different color of background is defined as character-invisible display, the electronic device comprising:
a display control unit for collectively controlling whether to display each selected area in at least text of a headword in a manner highlighted with a color designated as said different color or to display that area in a character-invisible manner using the designated color, for each area for which an identical color has been designated as said different color;
a first accepting unit for accepting designation of a color through an input device; and
an operation mode change unit for changing an operation mode at least from a first operation mode to a second operation mode, with an operation mode in which said highlighted display is carried out while said character-invisible display is not carried out being defined as the first operation mode and an operation mode in which said highlighted display and said character-invisible display are carried out being defined as the second operation mode,
said display control unit causing entire said each selected the area displayed in said manner highlighted with the designated color to be in turn displayed in said character-invisible manner based on said operation mode having been changed from said first operation mode to said second operation mode, using the designated color in case there is an area displayed in said manner highlighted with the designated color when said first accepting unit accepted designation of said color, while said display control unit causing the area displayed in said character-invisible manner using the designated color to be in turn displayed in said manner highlighted with the designated color in case there is an area displayed in said character-invisible manner using the designated color when said first accepting unit accepted designation of said color.

2. The electronic device according to claim 1, further comprising:
a second accepting unit for accepting designation of a color to be used for said highlighted display among a plurality of colors, based on input through the input device in said first operation mode; and
a selection unit for selecting said area based on input through said input device in said first operation mode, wherein
in said first operation mode, said display control unit causes said selected area to be displayed in said manner highlighted with the color accepted by said second accepting unit.

3. The electronic device according to claim 2, wherein
in said first operation mode, said display control unit causes said display to display detailed information including said headword and the text of the headword, and
in said first operation mode, said selection unit selects said area in displayed said detailed information.

4. The electronic device according to claim 2, wherein
in said first operation mode, said first accepting unit accepts designation of a color among said plurality of colors.

5. The electronic device according to claim 2, wherein
said input device is implemented by a touch panel provided with a display function,
in said first operation mode, said first accepting unit accepts designation of a color among said plurality of colors based on input through said touch panel, and
in said first operation mode, said second accepting unit accepts designation of a color to be used for said highlighted display among said plurality of colors based on input through said touch panel.

6. The electronic device according to claim 2, wherein
said display is implemented by a touch panel provided with an input function,
in said first operation mode, said first accepting unit accepts designation of a color among said plurality of colors based on input through said touch panel, and
in said first operation mode, said second accepting unit accepts designation of a color to be used for highlighted display among the plurality of colors based on input through said touch panel.

7. A method of controlling display on an electronic device having an electronic dictionary function,
assuming that displaying a character on a display, independently of a position of a cursor, with a color of background being different from a color of the character and being changed from a predetermined background color is defined as highlighted display and displaying a region corresponding to said displayed character and the background on the display by changing the color of the displayed character and the color of background into said different color of background is defined as character-invisible display,
the method comprising the steps of:
collectively controlling whether to display each selected area in at least text of a headword in a manner highlighted with a color designated as said different color or to display that area in a character-invisible manner using the designated color, for each area for which an identical color has been designated as said different color;
accepting designation of a color through an input device; and
changing an operation mode at least from a first operation mode to a second operation mode, with an operation mode in which said highlighted display is carried out while said character-invisible display is not carried out being defined as the first operation mode and an operation mode in which said highlighted display and said character-invisible display are carried out being defined as the second operation mode, wherein
in said collectively controlling step, in case there is an area displayed in said manner highlighted with the designated color when designation of said color was accepted in said step of accepting designation of a color, the entire area displayed in said manner highlighted with the designated color is in turn displayed in said character-invisible manner using the designated color based on said operation mode having been changed from said first operation mode to said second operation mode, and
in case there is an area displayed in said character-invisible manner using the designated color when designation of said color was accepted in said step of accepting designation of a color, the area displayed in said character-invisible manner using the designated color is in turn displayed in said manner highlighted with the designated color.

8. A computer-readable non-transitory recording medium encoded with instructions, wherein the instructions when executed in an electronic device having an electronic dictionary function,
assuming that displaying a character on a display, independently of a position of a cursor, with a color of background being different from a color of the character and being changed from a predetermined background color is defined as highlighted display and displaying a region corresponding to said displayed character and the background on the display by changing the color of the displayed character and the color of background into said different color of background is defined as character-invisible display, cause said electronic device to perform the steps of:

collectively controlling whether to display each selected area in at least text of a headword in a manner highlighted with a color designated as said different color or to display that area in a character-invisible manner using the designated color, for each area for which an identical color has been designated as said different color;

accepting designation of a color through an input device; and changing an operation mode at least from a first operation mode to a second operation mode, with an operation mode in which said highlighted display is carried out while said character-invisible display is not carried out being defined as the first operation mode and an operation mode in which said highlighted display and said character-invisible display are carried out being defined as the second operation mode, wherein in said collectively controlling step, in case there is an area displayed in said manner highlighted with the designated color when designation of said color was accepted in said step of accepting designation of a color, the entire area displayed in said manner highlighted with the designated color is in turn displayed in said character-invisible manner using the designated color based on said operation mode having been changed from said first operation mode to said second operation mode, and in case there is an area displayed in said character-invisible manner using the designated color when designation of said color was accepted in said step of accepting designation of a color, the area displayed in said character-invisible manner using the designated color is in turn displayed in said manner highlighted with the designated color.

* * * * *